Oct. 14, 1969     D. E. SMITH     3,472,329
PLATFORM SCALE AND STRAIN GAUGE LOAD CELL
SUSPENSION MECHANISM THEREFOR
Filed Aug. 4, 1967     2 Sheets-Sheet 1
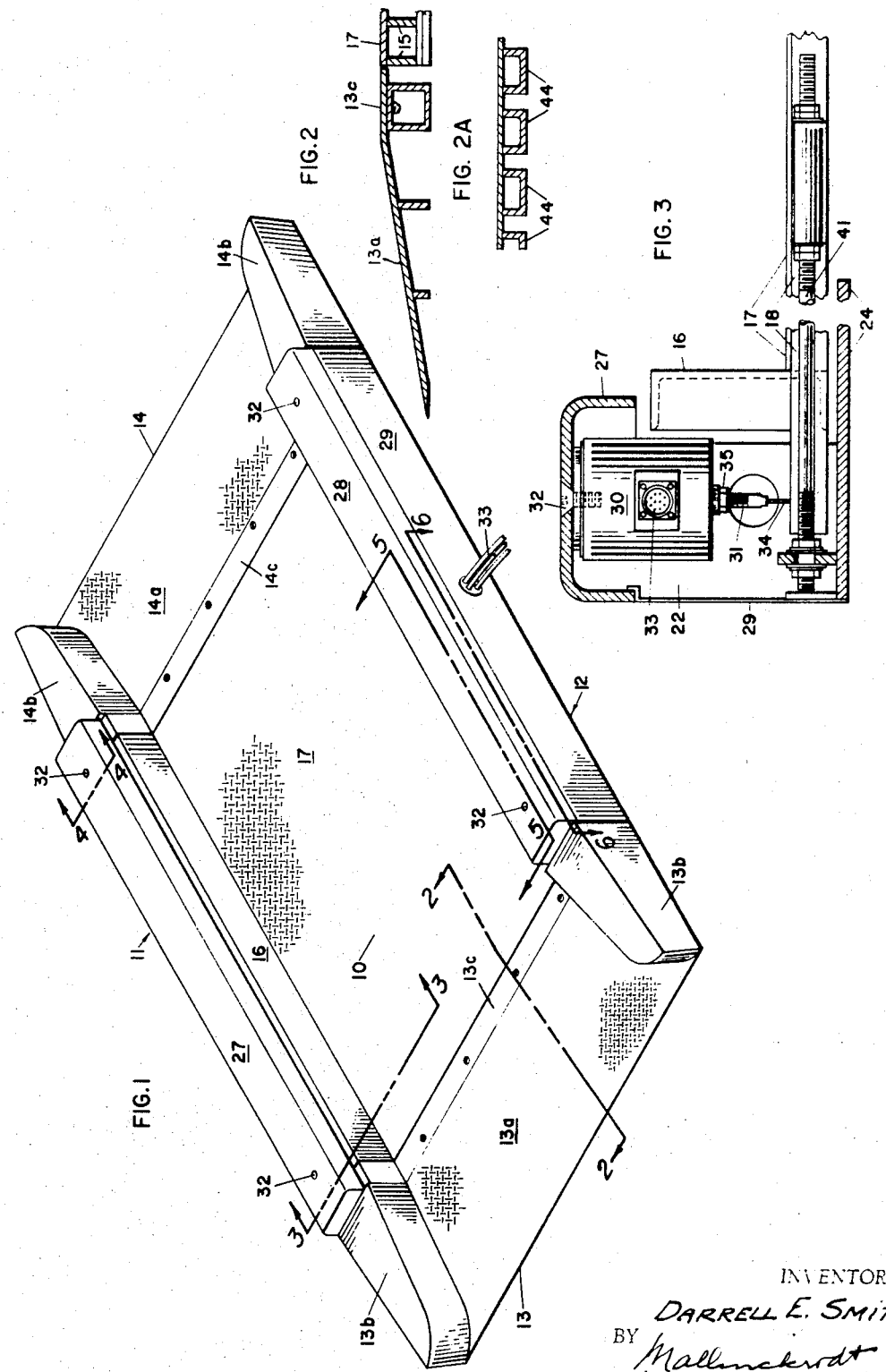
INVENTOR.
DARRELL E. SMITH
BY
ATTORNEYS Oct. 14, 1969 D. E. SMITH 3,472,329
PLATFORM SCALE AND STRAIN GAUGE LOAD CELL
SUSPENSION MECHANISM THEREFOR
Filed Aug. 4, 1967 2 Sheets-Sheet 2
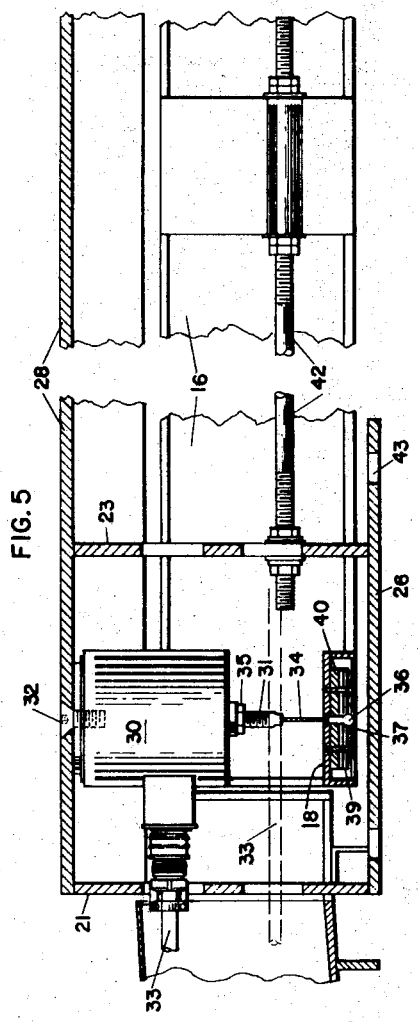
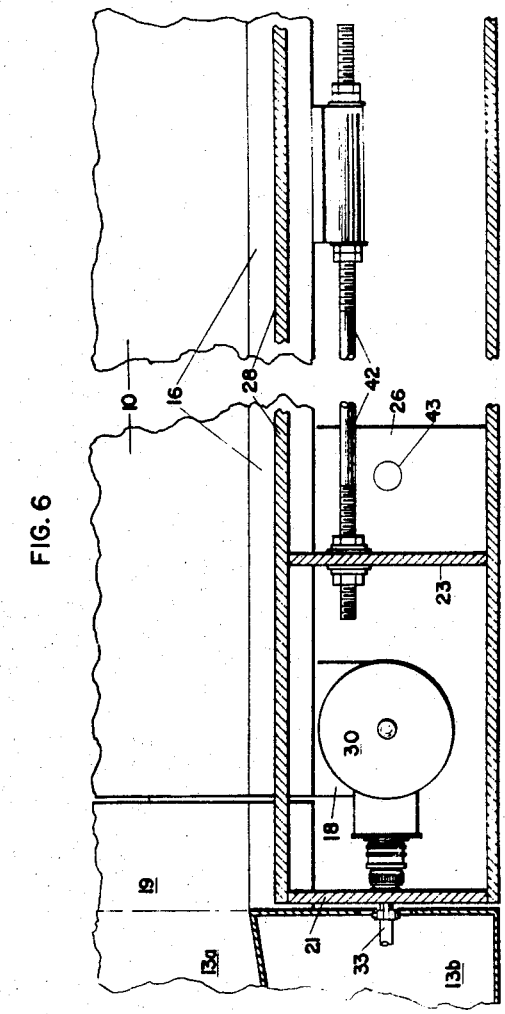
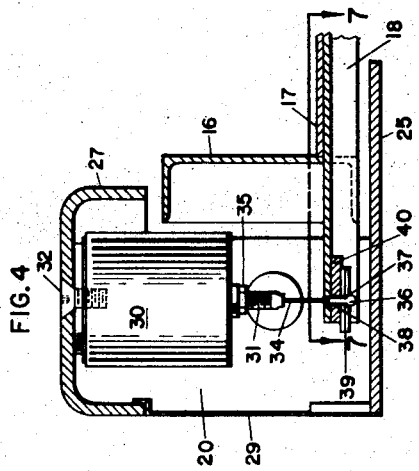
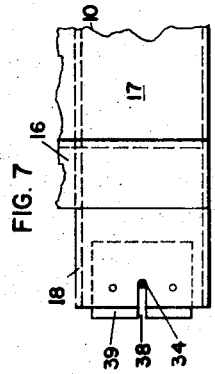
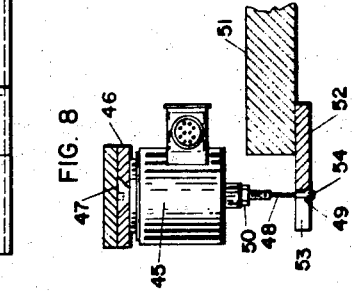
INVENTOR.
DARRELL E. SMITH
BY
Mallinckrodt and
Mallinckrodt
ATTORNEYS

United States Patent Office 3,472,329
Patented Oct. 14, 1969

3,472,329
PLATFORM SCALE AND STRAIN GAUGE LOAD CELL SUSPENSION MECHANISM THEREFOR
Darrell E. Smith, Bountiful, Utah, assignor to Hardy Scales Company, Maywood, Calif., a corporation of California
Filed Aug. 4, 1967, Ser. No. 658,485
Int. Cl. G01g 19/52
U.S. Cl. 177—211　　　　　　　　　　　　　　11 Claims

ABSTRACT OF THE DISCLOSURE

A platform type of weighing scale that requires no pit and can be readily moved from place to place. For any given weighing capacity, the scale can be constructed of exceptionally low profile and light weight. There are no moving mechanical parts, and relocation involves no disassembly. A drive-on platform is suspended in a unique manner from strain gauge load cells connected in an electrical circuit providing for readout of load weights or for some other utilization of the electrical signals generated by such load cells. The platform suspension mechanism in itself forms an inventive subcombination of the overall combination.

BACKGROUND OF THE INVENTION

Field

The invention is concerned with weigh scales of platform type that are conventionally constructed in pits to house the operating mechanism and that have their platforms more or less flush with the surrounding floor or road areas to enable drive-on loading.

Prior art

No prior art, other than the conventional pit-type platform scale or the smaller step-up type platform scale, is known to applicant, although the use of strain gauge load cells in weigh scales generally was common prior to the invention.

SUMMARY OF THE INVENTION

In order to achieve high capacity, with low profile and light weight, in a readily movable above-ground or above-floor, weigh scale, a scale platform is suspended from the columns of respective strain gauge load cells by respective short lengths of a suitable flexible connector, such as steel strand cable. The load cells may be of standard make and are themselves rigidly fastened to the undersides of low structural frame members at opposite lateral margins of the platform. In order to provide drive-on and drive-off access to the platform, a ramp is preferably provided at at least one end of the platform. Because this arrangement enables the platform to be positioned immediately above the ground or floor level, the ramp or ramps, need provide for raising a load only slightly above ground or floor level and can be quite short; however, the entire scale can be of usually low profile, because the frame members need be only the height of the platform plus the height of a load cell and flexible connection, making the total height of the frame members only about twice the height of a presently standard load cell.

For maximum accuracy in weighing, it is important that the load always be applied directly through the center of the load cell, and for scale portability it is important that the platform be readily disconnectable from each load cell. For these purposes, the flexible connector has a ball secured to its lower end for reception by a mating socket at the underside of the platform and at the inner end of a connector-accommodating slot that extends inwardly of the platform from the adjacent edge thereof. In this way, also the effective length of the flexible connector can be greater than its effective height, which is a significant advantage from the standpoint of the lowest possible profile for the scale; moreover, a damping pad can be utilized, without increasing the overall height of the scale. The resulting load suspension unit forms a subcombination of the overall combination of the invention that can be utilized advantageously in scales other than floor scales.

THE DRAWINGS

The weigh scales illustrated in the accompanying drawings represent the best modes presently contemplated of carrying out the invention, although it is recognized that the inventive concepts here taught can be utilized in a variety of specific forms within the scope of the claims.

FIG. 1 is an isometric view of a platform scale in accordance with the invention, looking from above;

FIG. 2, a fragmentary vertical section taken on the line 2—2 of FIG. 1;

FIG. 2a, a view corresponding to a part of FIG. 2, but showing an alternative construction for the platform;

FIG. 3, a fragmentary vertical section taken on the line 3—3 of FIG. 1;

FIG. 4, a similar view taken on the line 4—4 of FIG. 1;

FIG. 5, an enlarged fragmentary vertical section taken on the line 5—5 of FIG. 1, an intermediate section being broken out;

FIG. 6, a similar horizontal section taken on the line 6—6 of FIG. 1;

FIG. 7, a fragmentary horizontal section taken on the line 7—7 of FIG. 4; and

FIG. 8, a fragmentary vertical section taken through a bench-type weigh scale utilizing standard mechanical components and a load cell with a load suspension unit of the invention.

DETAILED DESCRIPTION OF ILLUSTRATED EMBODIMENTS

The platform scale illustrated in FIGS. 1–7 comprises a platform 10 for receiving loads to be weighed, structural side frames 11 and 12 for housing the operating components from which the platform is suspended, and ramps 13 and 14 providing drive-on and drive-off access to and exit from the platform.

Platform 10 may be constructed in various ways, so long as it is capable of carrying loads within the design capacity of the scale, e.g., 10,000–20,000 lbs. As illustrated, it includes a series of joist-like members 15 of narrow steel plates, extending transversely thereof between spaced longitudinal stringers in the form of structural steel channels 16 placed on edge, as shown in FIGS. 3 and 4, and steel floor plate 17 welded to the tops of such members 15 and to the backs of the channels to provide an unbroken platform surface, as shown in FIG. 1, with longitudinally extending side rails. Channels 18 extend transversely at opposite ends of the platform and project outwardly therebeyond as suspension mounts.

Ramps 13 and 14 are preferably each constructed as an independent unit, including a sloping ramp floor 13a or 14a, guide buttresses 13b or 14b at respective sides thereof and in positional alignment with side frames 11 and 12, and horizontal transition plates 13c or 14c at normal platform level.

Side frames 11 and 12 are preferably each fabricated from steel plates in the same manner to provide opposite end walls (see the end wall 20, FIG. 4, and the wall 21, FIGS. 5 and 6) and a pair of mutually spaced gusset plates (see the plates 22 in FIG. 3 and 23 in FIGS. 5 and 6), which rise from securement, as by welding, to partial bottom walls at opposite ends of the frames (see 24, FIG. 3, 25, FIG. 4, and 26, FIGS. 5 and 6), and serve to secure and support a longitudinally extending top wall, which is advantageously of inverted U-formation (see the top walls 27 and 28). Longitudinally extending side skirts 29 are desirable for both the sake of appearance and to complete protective housings for the operative components of the scale.

Secured to the undersides of top walls 27 and 28 directly above the outwardly projecting ends of platform transverse channels 18 and within the protective housings provided by the respective side frames are respective electrical, strain gauge, load cells 30, each having a load-supporting column extension 31 in the form of a rigid shank threaded into the column. The load cells may be standard stock items, as they are well known and readily available. They are advantageously secured in place by respective screws 32 and are electrically connected into any suitable circuit arrangement (not shown) providing weight read-out, recordings, or otherwise utilizing the electrical signals generated thereby, by electrical cables 33.

In accordance with the invention, platform 10 is suspended from the column extensions 31 of load cells 30 by means of short lengths 34 of a suitable type of load-supporting flexible connector, such as the steel strand cable shown, which are secured to the column extensions 31 by tight press fits. The column extensions provide for leveling adjustment of the platform 17 and, after adjustments, are made fast by means of jam nuts 35.

Readily disengageable, universally articulative connection of the opposite end of each cable length 34 to platform 10 immediately below the load cell and directly in line with the column extension 31 thereof is provided by a ball fitting 36, FIGS. 4 and 5, having a shank to which the cable end is attached by a tight press fit. The ball portion of such fitting 36 is freely received by a mating socket 37 formed at the underside of the platform, the shank and the lower part of the cable 34 being disengageably accommodated by a slot 38, FIG. 4, extending inwardly from the adjacent edge of the platform. As shown, the ball fitting is received by, and the slot 38 is formed in, the corresponding projecting end of a transverse end channel 18 of the platform, the ball-receiving socket 37 being formed at the underside of a resonance bracket 39, bolted (see FIG. 5) to such channel 18 and advantageously having a resilient damping pad 40 of, for example, a urethane elastomer, interposed between it and the channel 18 to which it is fastened.

For stabilizing the weigh platform 10, either or both transverse check links 41, FIG. 3, and longitudinal check links 42, FIGS. 5 and 6, may be provided in more or less customary manner, such as is shown.

For any given installation of the platform scale of this invention it is desirable that it be securely anchored to the floor, ground, or other support, as by means of bolts (not shown) or other anchoring devices passed through receiving holes, see 43, FIGS. 5 and 6, provided in the bottom walls 26 of the side frames 11 and 12.

In FIG. 2a there is shown an alternative platform construction, wherein inverted structural channels 44 are used throughout, instead of the joist-like members 15.

The unique load cell suspension unit of the invention can be used advantageosly in other types of weigh scales, for example, the bench type scale shown fragmentarily in FIG. 8. There, an electrical strain gauge load cell 45 is secured to the underside of a structural frame member 46 by a screw 47, and a short cable 48 carrying a ball fitting 49 hangs down from attachment to the column extension 50 of the load cell to receive and suspend the free end of an intermediate lever bar 51 constituting suspended means of conventional weigh scale mechanism. Such lever bar 51 includes a plate 52 secured, as by welding, to its underside, and such plate 52 has a slot 53 extending inwardly from an edge thereof for receiving and accommodating the shank of ball fitting 49, so the ball thereof can be seated in its mating socket 54.

Other arrangements of the load cell suspension unit of the invention in a variety of different weigh scale structures will be apparent to those skilled in the art.

Whereas this invention is here described and illustrated with respect to certain forms thereof, it is to be understood that many variations are possible.

I claim:

1. A platform type of weigh scale, comprising
a platform for receiving items to be weighed;
frame structures at a pair of opposite sides, respectively, of said platform and adapted to rest on and be supported by a floor or ground surface of an area where the scale is installed, said frame structures being adapted to serve as suspension supports for said platform;
strain gauge load cells attached to upper portions of said frame structures and depending therefrom as supports for said platform, said cells having depending load-supporting columns, respectively;
flexible connectors depending from connection with said columns, respectively, of load cells to connection with said platform so as to suspend said platform immediately above said floor or ground surface for weighing purposes, whereby said frame structures and the entire scale can be relatively low in height, without any pit;
height-adjustable means connecting one set of ends of said flexible connectors with respective load-supporting columns of the load cells to provide for leveling of the platform; and
signal output means for said load cells.

2. A platform type of weigh scale according to claim 1, wherein the connections between the flexible members and the platforms are respective ball members secured to the lower ends of the flexible connectors, wherein there are ball-receiving sockets formed at the underside of the platform, and wherein said ball members seat in said sockets.

3. A platform type of weigh scale according to claim 1, wherein drive-on and drive-off ramps lead to and from respectively opposite ends of the platform.

4. A platform type of weigh scale according to claim 1, wherein the height adjustable means are respective rigid shank members threaded into the load-supporting columns of the load cells.

5. A platform type of weigh scale according to claim 4, wherein the other set of ends of the flexible connectors have respective ball members secured thereto, wherein there are ball-receiving sockets formed at the undersides of the platform, and wherein said ball members seat in said sockets to provide the connection of said flexible connectors with the platform.

6. A platform type of weigh scale according to claim 5 wherein the platform is provided with members that project into said frame structures and that have slots extending from their edges inwardly to receive said flexible connectors, and wherein the ball-receiving sockets are formed at the inward ends of the slots.

7. A platform type of weigh scale according to claim 6, wherein damping pads are interposed between the sockets and the platform members.

8. In a weigh scale having frame structure and weigh scale mechanism including suspended means, the combination of a strain gauge load cell secured to and depending from said frame structure and having a depending load-supporting column; a flexible connector between said suspended means and said load cell; means securing the upper end of said connector to the said column of the load cell; a ball secured to the lower end of said connector; and a socket at the underside of said suspended means, said ball being seated in said socket, so the suspended means is suspended from the load cell.

9. The combination recited in claim 8, wherein the suspended means has a slot extending inwardly from an edge thereof, and wherein the ball-receiving socket is formed at the inward end of the slot.

10. The combination recited in claim 9, wherein the means securing the upper end of the flexible connector to the load-supporting column of the load cell is a rigid shank having its upper end threaded into the column and its lower end fastened to said upper end of the flexible connector.

11. A platform type of weigh scale, comprising a platform for receiving items to be weighed;
- frame structures at a pair of opposite sides, respectively, of said platform and adapted to rest on and be supported by a floor or ground surface of an area where the scale is installed, said frame structures being adapted to serve as suspension supports for said platform;
- strain gauge load cells attached to upper portions of said frame structures and depending therefrom as supports for said platform, said cells having depending load-supporting columns, respectively;
- lengths of flexible material depending from connection, at one set of their ends, with said columns of respective load cells to connection, at the opposite set of their ends, with said platform so as to suspend said platform immediately above said floor or ground surface for weighing purposes, whereby said frame structures and the entire scale can be relatively low in height, without any pit; and
- signal output means for said load cells.

References Cited

UNITED STATES PATENTS

| | | | |
|---|---|---|---|
| 2,962,276 | 11/1960 | Thurston | 177—211 X |
| 3,103,984 | 9/1963 | Ellis et al. | 177—211 |
| 3,258,078 | 6/1966 | Crone et al. | 177—211 |
| 3,299,976 | 1/1967 | Boadle et al. | 177—134 |

ROBERT S. WARD, Jr., Primary Examiner

GEORGE H. MILLER, Jr., Assistant Examiner

U.S. Cl. X.R.

177—132

PO-1050
(5/69)

UNITED STATES PATENT OFFICE
CERTIFICATE OF CORRECTION

Patent No. 3,472,329      Dated October 14, 1969

Inventor(s) Darrell E. Smith

It is certified that error appears in the above-identified patent and that said Letters Patent are hereby corrected as shown below:

Column 1, line 57, the comma should be removed; line 59, "usually" should read --unusually--.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents